United States Patent [19]

Miranda

[11] 3,719,728

[45] March 6, 1973

[54] RADIATION CURABLE COMPOSITIONS

[75] Inventor: Thomas J. Mirnada, Granger, Ind.

[73] Assignee: The O'Brien Corporation, South Bend, Ind.

[22] Filed: Feb. 12, 1970

[21] Appl. No.: 11,026

Related U.S. Application Data

[63] Continuation-in-part of Ser. No. 654,391, July 19, 1967, abandoned.

[52] U.S. Cl. ............... 260/861, 260/873, 260/75 EP, 260/75 UA, 260/78.5 BB, 260/885, 204/159.14, 260/159.15, 204/159.19

[51] Int. Cl. .......................... C08f 11/02, C08f 21/00

[58] Field of Search ..260/861, 75 UA, 78.4 EP, 873; 252/188.3; 204/159.19

[56] References Cited

UNITED STATES PATENTS

| | | | |
|---|---|---|---|
| 2,966,479 | 12/1960 | Fischer | 260/78.4 |
| 3,022,262 | 2/1962 | Hyde | 260/43 |
| 3,089,863 | 5/1963 | Hicks et al. | 260/75 |
| 3,262,991 | 7/1966 | McLendon et al. | 260/873 |
| 3,296,219 | 1/1967 | Jacoby et al. | 260/78.4 |
| 3,374,208 | 3/1968 | Seiner et al. | 260/78.4 |
| 3,375,301 | 3/1968 | Case et al. | 260/869 |
| 3,376,273 | 4/1968 | Masters et al. | 260/78.4 |

OTHER PUBLICATIONS

Boenig, "Unsaturated Polyesters", Elsevier 1964, pp. 193–197

*Primary Examiner*—William H. Short
*Assistant Examiner*—E. A. Nielsen
*Attorney*—Merriam, Marshall, Shapiro & Klose

[57] ABSTRACT

Radiation curable compositions are made from polymer precursors which are reaction products of aliphatic polycarboxylic acids and monoepoxide compounds containing at least one vinyl group. The precursors, which have molecular weights up to 1000, may be diluted with polymerizable solvents such as styrene to produce radiation curable coating compositions which are essentially 100 percent convertable.

9 Claims, No Drawings

RADIATION CURABLE COMPOSITIONS

This application is a continuation-in-part of my copending application Ser. No. 654,391 filed July 19, 1967, now abandoned.

This invention is concerned generally with the production of radiation curable compositions and their transformation into an insoluble infusible state through the use of radiation. In particular, this invention deals with polymerizable or curable compounds, hereinafter called polymer precursors, which contain at least two ethylenically unsaturated carbon-to-carbon bonds and at least two ester linkages. In general, the present invention contemplates polymer precursors which are the reaction product of aliphatic polycarboxylic acids, preferably containing at least some ethylenic unsaturation; and monoglycidyl ether compounds, hereinafter sometimes referred to as epoxide compounds, which contain at least one vinyl group; wherein said polymer precursors have a molecular weight not more than about 1,000.

The monoepoxide compounds which may be used to produce the radiation curable compositions include vinyl cyclohexene monoxide, glycidyl acrylate, glycidyl methacrylate, divinyl benzene monoxide, glycidyl crotonate, butadiene monoxide, alkyl glycidyl maleate, wherein the alkyl group contains from one to about eight carbon atoms, alkyl glycidyl fumarate, wherein the alkyl group contains from one to about eight carbon atoms, various heterocyclic monomers such as 2(1-aziridinyl) ethyl methacrylate and mixtures thereof. Vinyl cyclohexene monoxide is the preferred epoxide for use in this invention since it is commercially available and provides the greatest stability in the finished product. Vinyl cyclohexene monoxide is prepared by the oxidation of vinyl cyclohexene. Although the resulting compound contains a saturated six carbon ring, it is referred to as vinyl cyclohexene monoxide throughout the application.

The radiation curable compositions of this invention may be produced from various aliphatic polycarboxylic acids. While the dicarboxylic acids such as itaconic acid, fumaric acid, tetrahydrophthalic acid, and maleic acid are generally preferred, acids containing more than two acid groups per molecule may be used, such as citric acid, glutaconic acid, and 1,1,5-pentanetricarboxylic acid. Polycarboxylic acids which also contain hydroxy groups may also be useful for some purposes, as explained below.

It is preferred that sufficient epoxide compound be used to react with all the acid groups of the acids used; that is, it is preferred that a stoichiometric quantity of the epoxide compound be used in order that all of the acid groups be esterified. The completely esterified polymer precursors have the maximum concentration of vinyl groups, which in turn yields a highly reactive polymer precursor. However, under some circumstances, as hereinafter explained, more or less than the stoichiometric requirement of the epoxide may be employed.

The radiation curable polymer precursors of this invention may be blended with various addition polymerizable liquid monomers, which function as reactive solvents, to yield coating compositions which are 100 percent convertible or curable. The coating compositions of this invention present an economic advantage over conventional coatings since they are 100 percent convertible. Although for practical purposes, solvents may be used in order to enhance the application properties, solvents are not necessary to achieve film properties found desirable for many cases.

Radiation curable polymer precursors of this invention are preferably dissolved or dispersed in addition polymerizable monomers such as styrene, alpha substituted styrenes, the chloro styrenes, various alkyl styrenes (alkyl substituents attached to benzene ring), vinyl pyrrolidone, alkyl acrylates, alkyl methacrylates, alkoxy acrylates, alkoxy methacrylates, hydroxy alkyl acrylates, hydroxy alkyl methacrylates, divinyl benzene, the acrylate and methacrylate esters of trimethylol propane, trimethylol ethane and other polyglycols, the alkyl esters of acrylic and methacrylic acid wherein the alkyl groups contain up to 10 carbon atoms, vinyl diallyl phosphates, vinyl silanes, and other similar liquid monomers. The proportion of the addition polymerizable monomer used in the compositions of this invention may be varied and may be as high as 150 percent, based on the weight of the polymer precursor. Normally, it is desirable to keep the addition monomer level at less than 50 percent, based on the weight of the precursor.

The radiation curable polymer precursors of this invention may be made in any convenient manner. It has been found that the precursors of this invention may be made by a slow addition of an appropriate epoxide to an appropriate acid, with or without solvent, preferably when the temperature is held in the range between 70° and 150° C. Although temperatures above 150° C may be useful under some conditions, such temperatures can cause an undesired premature gellation of the esters.

As was mentioned above, it is preferred that sufficient epoxide compound be used to esterify all of the free acid moiety of the acid material, e.g. a stoichiometric requirement. The extent of the completeness of the reaction can be determined by alkalimetry or epoxy number determination.

The reaction may be carried out in conventional apparatus at temperatures of about 70°-150° C. Although the reaction proceeds without being catalyzed, catalysts such as cobalt naphthenate, dibutyl tin acetate and other siccative type metal salts can be used. In order to avoid premature polymerization of the vinyl groups, from about 50 to about 2000 parts per million of a conventional polymerization inhibitor such as hydroquinone, methyl ether of hydroquinone, or the like may be incorporated in the reaction mixture.

The finished polymer precursor mixture is stable, fluid (viscosity of 500-12,000 centipoise) at room temperature, and has a color of 1-12, generally 3-6 (Gardner). While the molecular weight of the preferred species (citric acid - vinyl cyclohexene monoxide reaction product) is about 564, the molecular weight of the other species can be as high as about 1000. The precursor will cure to a hard polymer when subjected to ionizing radiation. Preferably the curing is effected at room temperature by exposing the finished monomer to a high voltage electron beam radiation using dosages of about 0.25-50 MRad (megarads).

The radiation curable polymer precursors of this invention can be dissolved or dispersed in water when the acid value is above 35, or can be likewise dissolved or dispersed in various liquid monomers, and as such can be used for coating paper, wood or plastic. If it is desired to use an aqueous based coating system, the water may be removed prior to curing from the uncured coating by the use of microwave ovens in order to provide for rapid removal of the water before the compositions are radiated. The curing is preferably accomplished by radiation such as is achieved by a linear accelerator or suitable radiation source. The required absorbed dose will vary from 0.1 to 50 MRads but most of the compositions of this invention can be suitably cured by radiation in the range of 1 to 10 MRads.

Time of curing will depend upon the bulk of the polymer precursor. In coating applications, exposures of 0.1–10 seconds and generally 1 second are sufficient. Electron beam radiators suitable for use in this invention are commercially available, Van de Graff type electron accelerators, linear accelerators, or other sources producing gamma type radiation can be employed. For a further discussion of electron beam radiation see "The Handbook of High Voltage Electron-Beam Processing", 1959, published by High Voltage Engineering Corporation, Burlington, Mass.

The compositions of this invention may also be cured through the use of free radical reaction or redox methods, although the resulting cured material will not necessarily be identical to materials cured by ionizing radiation. For instance, free radical generating catalysts can be incorporated into the ester composition, and used to cure the composition.

In the event curing is effected by the use of polymerization initiators, conventional peroxide or azo catalysts can be used and the polymer precursors of this invention polymerized in bulk, solution, emulsion, or suspension.

If desired, the free hydroxy moiety of the citric acid may be reacted with a suitable dicarboxylic acid anhydride, either before or after the citric acid is reacted with the epoxide. Suitable dicarboxylic acid anhydrides include aliphatic dicarboxylic acid anhydrides such as maleic anhydride, aromatic dicarboxylic acid anhydrides such as phthalic anhydride as well as its hydrogenated and halogenated derivatives such as tetrahydrophthalic anhydride and tetrachlorophthalic anhydride. Also useful are some of the terpene-based anhydrides such as 5-norbornene-2,3-dicarboxylic anhydride and their alkylated and halogenated derivatives such as methyl-5-norbornene-2,3-dicarboxylic anhydride and 1,4,5,6,7,7 hexachlorobicyclo-2,2,1 hept(5) ene-2,3-dicarboxylic anhydride. The result of the reaction between the aforesaid anhydrides and the free hydroxyl moiety of the citric acid is to introduce an ester moiety and a free acid moiety which can be useful for introducing flexibility or for rendering the resulting composition water-soluble.

Alternately, the free hydroxy moiety of the citric acid can be left unreacted. If a flexibility is desired, the free hydroxy moiety may be reacted by using an epoxide, such as the glycidyl ester of Versatic acid, butyl glycidyl ether or related epoxides, in order to provide an internal plasticizer. Likewise, small amounts of such epoxides may be used to replace a small proportion of the vinyl containing epoxides, in order to provide internal plasticizers for those compositions based on aliphatic polycarboxylic acids which do not contain a hydroxy group. The advantage of this system is that the glycidyl esters of Versatic acid, and like epoxides function as built in plasticizers which cannot migrate from or be leached out of the film.

The following examples will serve to illustrate the preparation and use of the radiation curable compositions of this invention, but it is understood that these examples are set forth merely for illustrative purposes and many other compositions are within the scope of the invention.

Example I

A one liter flask was equipped with a stirrer, a condenser, a dropping funnel and a inert gas inlet. ONe mole (192 grams) of anhydrous citric acid powder and 100 grams of methyl isobutyl ketone (solvent) were placed in the flash and stirred. The flask was then flushed out with nitrogen, and the nitrogen was thereafter introduced into the flask at about 200 cc per minute. The flask then was slowly heated to 115° C, at which time the dropwise addition of 372 grams (3 moles) of vinyl cyclohexene monoxide was commenced. The temperature rose to 145° C during the addition, and was maintained at between 135° and 140° C for another 45 minutes while the reaction continued. The acid number of the resulting product was determined using alcoholic potassium hydroxide, and showed an acid value of 54.2. At this time, the temperature was lowered to 134° C and 98 grams (1 mole) of maleic anhydride was added to the reaction mixture. The temperature was maintained at 134° C for 30 minutes. The acid number determined again, was found to be 121. The resulting polymer precursor was poured from the flask into a glass lined container. The precursor had a shelf life of about 6 months, a molecular weight of 662, and a viscosity greater than S (Gardner-Holdt) including the 100 grams of MIBK solvent. The color was 6. The density of the material was 9.56 pounds per gallon, again, including the solvent.

In order to evaluate this polymer precursor, 300 grams were blended with 40 grams of 2-hydroxy-ethylacrylate. The resulting mixture was drawn down with a three mil bar on birch plywood, bonderized steel, ceiling tile, and exterior hardboard and each substrate was subjected to a 10 MRad dose of radiation using an electron beam. For each substrate, a hard, tack-free surface was obtained, having good solvent and chemical resistance. The "Crosscut Adhesion Test" ("Paint Testing Manual" by Gardner and Sward, 12th Edition 1962, Page 160) indicated the coating was superior to conventional alkyd/urea systems.

Another 300 gram aliquot of the polymer precursor prepared in accordance with Example I was diluted with 40 grams of vinyl toluene. This formed a clear viscous solution which was drawn down on the substrates cited above with a draw-down bar set at 3 mils and subjected to 10 MRads of radiation by an electron beam. Hard, tack-tree surfaces were obtained on all substrates.

Example II

A 2 liter flask was equipped as described in Example I. To this flask were added 336 grams (1.75 moles) of citric acid and 175 grams of methyl isobutyl ketone as a solvent, which were then stirred together, purged with nitrogen and heating was commenced. When the temperature reached 60° C, 650 grams (5.25 moles) of vinyl cyclohexene monoxide were added over a 30-minute period. The temperature rose to 148° maximum during the addition of the epoxide. The reaction mixture was held at a temperature between 120° C and 132° C for an additional 2 hours and then cooled. The resulting polymer precursor, having a molecular weight of 564, was poured into a suitable container.

In order to evaluate this precursor, 103 grams were diluted with 31 grams of hydroxy ethyl acrylate and subjected to radiation curing in a manner similar to that described in Example I. A hard tack-free surface was obtained.

Example III

A two liter flask was equipped as described in Example I. To this flask were added 98.0 grams (0.845 moles) of fumaric acid and 500 grams of methyl isobutyl ketone, as a solvent. These materials were stirred, purged with nitrogen and heated, and when the temperature reached 90° C, 242 grams (1.95 moles) of vinyl cyclohexene monoxide were added, dropwise, over a 30-minute period. The temperature briefly rose to 150° C during this addition. The temperature was held at 135° C for a total reaction time of 3 hours. The resulting polymer precursor had a molecular weight of 361. Separate portions of the resulting polymer precursor were then diluted with n-hexyl acrylate, hydroxy ethyl acrylate, vinyl toluene, 2-ethoxyethyl acrylate, and butyl acrylate in a ratio of 50 parts (by weight) of polymer precursor to 20 parts by weight of the monomer. These coatings were made up as described in Example I, coated on plywood, bonderized steel, hardboard and ceiling tile, and subjected to radiation curing at 10 MRads. All samples presented good hard, tack-free surfaces. The coating containing hydroxy ethyl acrylate seemed to be best of the five samples, while the vinyl toluene containing coating seemed to have some slight surface tack.

Example IV

To a 2 liter flask, equipped as described in Example I, was added 130 grams (1 mole) of itaconic acid and 50 grams of methyl isobutyl ketone. The flask was flushed with nitrogen and heated to 90° C. Then 242 grams (1.95 moles) of vinyl cyclohexene monoxide was added dropwise and the temperature was held at 130° C for 2 hours. The reaction product was then cooled. It had an average molecular weight of about 273.

One hundred grams of the resulting polymer precursor were dissolved in 50 grams of vinyl pyrrolidone. The solution was drawn down on plywood and subjected to a 10 MRad dose, yielding a tough, tack-free coating.

In another test, 100 grams of the polymer precursor were thinned with 100 grams of hydroxyethyl acrylate. An ink was prepared by the addition of 5 percent carbon black. The ink was applied to paper by conventional means and subjected to radiation doses of 5, 10 and 20 MRads. Although the sample exposed to 5 MRads showed some tack, no tack was observed with respect to the samples cured at 10 or 20 MRads.

Example V

In order to illustrate the improved flexibility achieved through the use of an internal flexibilizer, the following experiment was conducted. A reaction flask was equipped as described in Example I, to this was added 192 grams (1 mole) of citric acid and 100 grams of methyl isobutyl ketone solvent. Flask was flushed with nitrogen and heated to 95° C at which time the dropwise addition of 372 grams (3 moles) vinyl cyclohexene monoxide was commenced and continued for an hour. During the addition, the temperature rose to 110°. At that time, 230 grams (1.07 moles) of the glycidyl ester of Versatic acid*(*Versatic acid is tertiary carboxylic acid formed by the reaction of a propylene trimer (C–9 olefin) and carbon monoxide in the presence of suitable catalysts.) was added over a 25-minute period and the temperature increased to 138° C. the temperature of the reaction mixture was held at 130°–138° C over a 2-hour period.

The resulting polymer precursor, which had an average molecular weight of about 779, was then thinned using 40 parts of hydroxy ethyl acrylate per 300 parts of resin. A second sample was made up using 70 parts of vinyl toluene with 300 parts of polymer precursor. Both of these samples were evaluated as described in Example I after curing under an electron beam at 10 MRads. The cured coating was more flexible than the coating prepared as illustrated in Example I.

To illustrate lower dose cures, the coatings were drawn down again on the same substrates and covered with silicone release paper. After radiation doses of 2 MRad, the cover sheet was removed and a hard, tack-free surface was observed.

Example VI

The polymer precursor of Example I, using 225 grams of the precursor, was mixed with 60 grams of hydroxyethyl acrylate. This mixture was diluted with additional hydroxyethyl acrylate to give a solution of 71 percent solids, although upon radiation curing the hydroxyethyl acrylate did polymerize which proves the original mixture was 90 percent convertible. Using a disperser, 143 parts of this solution were ground at high speeds with 214 parts of titanium dioxide. When this dispersion was complete, the remaining 142 grams of the polymer precursor hydroxyethyl acrylate mixture was added. The resulting white coating was applied to birch panels with coatings three mils thick, and subjected to radiation at 10 MRads. This yielded a hard coating with excellent gloss which passed the above referred to cross-hatch adhesion test and 50 acetone rubs.

Example VII

The vehicle described in Example I was evaluated as an adhesive. Heavy cloth was impregnated with the vehicle, and then 20 mesh aluminum oxide was dropped over the surface. The resulting combination was subjected to a 20 MRad dose. This yielded a sandpaper in which the abrasive was well bound to the cloth.

When dissolved in such monomers, the polymer precursors of this invention are suitable for use as coating compositions giving clear coatings on wood, paper, plastic, or metals including wire, or can be used as adhesives or binders and as paper coatings, can coatings, coating resins, appliance primer and topcoats, nonwoven fiber binders and related applications. The compositions of this invention are also useful as polyester prepegs, printing inks, and binders for solid propellants. When pigmented, these compositions are suitable as fillers, primers, or topcoats for wood, paper, or plastic, such as nylon, polycarbonates, polyesters and polysulfones, ceiling tile or floor finishes or exterior wood, compositions, or aluminum and steel siding as well as galvanized and other types of metal.

The compositions of this invention advantageously may be used for encapsulating various electron components. Through the use of higher doses of radiation, less heat is generated, which, in turn, gives less heat distortion of the electronic components.

The halogenated derivatives are suitable as fire retardant compositions for ceiling tile or can be pigmented with antimony oxide or various halogenated phosphates such as Phos-Chek P-30 sold by Monsanto Chemical Co. to improve fire inhibition.

The monomers which may be used to disperse or dissolve the polymer precursors of this invention may be used alone or in combination to impart such characteristics as the flexibility, adhesion, cross-linking, flow and leveling during application. The compositions of this invention may be blended with other polymers as desired. These compositions may be applied by spraying, roll coating, dipping, curtain coating, and other conventional methods.

Rigid and flexible foams can also be prepared using the compositions of this invention. In preparing foams, blowing agents are incorporated into the system to form the desired cellular structure.

A Rad, as is recognized in the art, is defined as that amount of nuclear radiation which dissipates 100 ergs of energy per gram of tissue or $6.242 \times 10^{13}$ electron volts per gram in the process. It is approximately equal to the amount of energy that would be dissipated by one roentgen X-ray beam in a gram of tissue. A MRad or megarad is defined as one million Rad.

All parts and percentages, as used herein are in terms of weight, unless expressly stated otherwise. All temperatures are in centigrade.

The forms of invention herein shown and described, are considered only as illustrative. It will be apparent to those skilled in the art, that numerous modifications may be made therein without departure from the spirit of the invention or from the scope of the appended claims.

I claim:

1. A radiation curable composition consisting essentially of a polymer precursor either with or without a polymerizable vinyl monomer, said polymer precursor having a molecular weight not more than about 1000, said polymer precursor formed by the reaction of (a) an aliphatic polycarboxylic acid selected from the group consisting of citric; itaconic; fumaric; maleic; tetrahydrophthalic; and mixtures thereof, and (b) approximately a stoichiometric quantity of a mono epoxide compound containing at least one vinyl group selected from the group consisting of vinyl cyclohexene monoxide; glycidyl acrylate; glycidyl methacrylate; divinyl benzene monoxide; butadiene monoxide; glycidyl crotonate; alkyl glycidyl maleate wherein the alkyl group contains from one to about eight atoms; alkyl glycidyl fumarate wherein the alkyl group contains from one to about eight carbon atoms; and mixtures thereof.

2. A radiation curable composition as described in claim 1, wherein said composition includes an addition polymerizable vinyl monomer.

3. A radiation curable composition as described in claim 2, which includes up to 150 percent of an addition polymerizable vinyl monomer based on the weight of said polymer precursor.

4. A radiation curable composition as described in claim 2, which includes less than 50 percent of an addition polymerizable vinyl monomer, based on the weight of said polymer precursor.

5. A radiation curable composition as described in claim 4, wherein the addition polymerizable vinyl monomer is selected from the group consisting of styrene, alpha alkyl styrenes, halogenated styrenes, alkyl styrenes, vinyl pyrrolidone, alkyl acrylates, alkyl methacrylates, alkoxy acrylates, alkoxy methacrylates, hydroxy alkylacrylates, hydroxy alkyl methacrylates, and divinyl benzene and mixtures thereof.

6. A radiation curable composition as described in claim 1, wherein said polymer precursor is formed by the reaction of citric acid and vinyl cyclohexene monoxide.

7. A method of making a radiation curable polymer precursor having a molecular weight not more than about 1000, consisting essentially of reacting an aliphatic polycarboxylic acid selected from the group consisting of citric; itaconic; fumaric; maleic; tetrahydrophthalic; and mixtures thereof with approximately a stoichiometric quantity of a mono epoxide compound containing at least one vinyl group selected from the group consisting of vinyl cyclohexene monoxide; glycidyl acrylate; glycidyl methacrylate; divinyl benzene monoxide; butadiene monoxide; glycidyl crotonate; alkyl glycidyl maleate wherein the alkyl group contains from one to about eight carbon atoms; alkyl glycidyl fumarate wherein the alkyl group contains from one to about eight carbon atoms; and mixtures thereof at a temperature between about 70° and about 150°C.

8. A method as described in claim 7, wherein the reaction is carried out in the absence of oxygen.

9. A method as described in claim 7, wherein the reaction is carried out in the absence of a catalyst.

\* \* \* \* \*

PO-1050
(5/69)

UNITED STATES PATENT OFFICE
CERTIFICATE OF CORRECTION

Patent No. 3,719,728      Dated March 6, 1973

Inventor(s) Thomas J. Miranda

It is certified that error appears in the above-identified patent and that said Letters Patent are hereby corrected as shown below:

Title page, item 75, "Mirnada" should be --Miranda--.

Column 2, line 4, "cases" should be --uses--.

Column 4, line 14, "a inert" should be --an inert--

"ONe" should be --One--.

Column 8, line 10 (claim 1), after "eight" insert --carbon--.

Signed and Sealed this twenty-fourth Day of February 1976

[SEAL]

Attest:

RUTH C. MASON
*Attesting Officer*

C. MARSHALL DANN
*Commissioner of Patents and Trademarks*